(12) United States Patent
Koike et al.

(10) Patent No.: US 7,192,994 B2
(45) Date of Patent: *Mar. 20, 2007

(54) METHOD OF PRODUCING POLYESTER POWDERY COATING MATERIAL

(75) Inventors: Nobuyuki Koike, Hiratsuka (JP); Shojiro Kuwahara, Hiratsuka (JP)

(73) Assignee: Mitsubishi Gas Chemical Co., Inc., Tokyo (JP)

(*) Notice: Subject to any disclaimer, the term of this patent is extended or adjusted under 35 U.S.C. 154(b) by 177 days.

This patent is subject to a terminal disclaimer.

(21) Appl. No.: 10/960,925

(22) Filed: Oct. 12, 2004

(65) Prior Publication Data

US 2005/0113490 A1  May 26, 2005

Related U.S. Application Data

(63) Continuation-in-part of application No. 10/096,286, filed on Mar. 13, 2002, now Pat. No. 6,822,022.

(30) Foreign Application Priority Data

Apr. 25, 2001 (JP) .............................. 2001-126989

(51) Int. Cl.
*C08J 3/12* (2006.01)
(52) U.S. Cl. ................. 523/332; 523/340; 523/348; 525/165; 525/172; 525/173; 525/174; 525/176; 525/437; 525/438; 525/439; 525/440; 525/448
(58) Field of Classification Search ................ 523/332, 523/340, 348, 438; 525/165, 172, 173, 174, 525/176, 437, 438, 439, 440, 448
See application file for complete search history.

(56) References Cited

U.S. PATENT DOCUMENTS 5,461,089 A  10/1995  Handyside et al.
6,255,523 B1  7/2001  Panandiker et al.
6,583,187 B1 * 6/2003  Daly et al. .................... 521/56

FOREIGN PATENT DOCUMENTS

| DE | 43 13 762 C 1 | 4/1994 |
| EP | 0 322 834 | 7/1989 |
| EP | 0664 325 | 7/1995 |
| EP | 0936 261 | 8/1999 |
| EP | 1 186 622 A2 | 3/2002 |

(Continued)

OTHER PUBLICATIONS

Abstract, XP-002211243 & JP 053729 (1 pg.).
Abstract, XP-002211244 & JP 302567 (1 pg.).
Abstract, JP11302567 (1 pg.).

*Primary Examiner*—David W. Wu
*Assistant Examiner*—M. Bernshteyn
(74) *Attorney, Agent, or Firm*—Sherman & Associates

(57) ABSTRACT

Disclosed is a method of producing a powdery coating material by using: a curable polyester resin (A) having a hydroxyl group and/or a carboxyl group at the terminals thereof, and further having a number average molecular weight of from 1,000 to 30,000, a glass transition temperature of from 30 to 100° C.; a curing agent (B) which is solid at normal temperature and is capable of being reacted with the hydroxyl group or the carboxyl group of the curable polyester resin (A); and a solvent (C) having a boiling point under normal pressure of from 50 to 130° C.; and comprising a step of kneading the curable polyester resin (A), the curing agent (B) and the solvent (C) under condition in which at 50 to 130° C., not less than 20% by weight of the curing agent (B) is dissolved in the solvent and, then, vapor-removing the solvent (C) under a reduced pressure.

19 Claims, 4 Drawing Sheets

FOREIGN PATENT DOCUMENTS

| | | |
|---|---|---|
| EP | 1 273 626 A1 | 1/2003 |
| EP | 1 340 779 A1 | 9/2003 |
| JP | 10053729 A * | 2/1998 |
| WO | WO 02/24799 | 3/2002 |
| WO | WO 02/42385 | 5/2002 |

* cited by examiner

METHOD OF PRODUCING POLYESTER POWDERY COATING MATERIAL

CROSS REFERENCE TO RELATED APPLICATION

This application is a continuation-in-part application of Ser. No. 10/096,286 filed on Mar. 13, 2002 now U.S. Pat. No. 6,822,022, which claims foreign priority to JP 2001-126989 filed on Apr. 25, 2001.

BACKGROUND OF THE INVENTION

1. Field of the Invention

The present invention relates to a method of producing a polyester powdery coating material comprising a curable polyester resin.

2. Description of the Related Art

Powdery coating materials do not generate volatile organic compounds during the baking, do not cause environmental problems such as air pollution, and have, hence, been used in a wide field of applications to substitute for the solution coating materials.

Such powdery coating materials are obtained by blending a curable resin with a curing agent, and can be represented by acrylic powdery coating materials using, as a curable resin, a curable acrylic resin having a glycidyl group or a hydroxyl group, polyester powdery coating materials using a curable polyester resin having a hydroxyl group or a carboxyl group, and epoxy powdery coating materials using an epoxy resin. As the curing agents for the acrylic powdery coating materials, there have been known an aliphatic dibasic acid, a blocked isocyanate, an uretdione and an amino compound. As the curing agents for the polyester powdery coating materials, there have been known a blocked isocyanate, an uretdione, an amino compound, an epoxy compound and a glycidyl compound. As the curing agents for the epoxy powdery coating materials, there have been known a dicyanediamide and an acid anhydride.

The powdery coating materials have heretofore been produced by dry-mixing pigments and other additives for the coating materials in addition to the curable resin and curing agent, kneading and dispersing them by using a melt-kneader, pulverizing them and classifying them.

In heating and melt-kneading the curable resin and the curing agent according to this method, however, it is necessary to suppress the crosslinking reaction between the curable resin and the curing agent. Therefore, limitation is imposed such as conducting the kneading within a short period of time and effecting the kneading at a temperature lower than the melting point or the softening point of the curing agent, making it difficult to homogeneously disperse the curing agent. Namely, with the powdery coating material in which the curing agent is not homogeneously dispersed, the film formed therefrom lacks appearance and, particularly, smoothness. Besides, the pigment is poorly dispersed, and the powdery coating material makes it difficult to obtain a film that exhibits vividness, sharpness and gloss comparable to those of liquid coating materials.

In order to improve such problems, therefore, there have been proposed methods of mixing the starting materials of the powdery coating material, such as a curable resin and a curing agent in a wet manner, i.e., in a solvent [Japanese Unexamined Patent Publication (Kokai) No. 25531/1979 (a), Japanese Unexamined Patent Publication (Kokai) No. 53729/1998 (b), Japanese Unexamined Patent Publication (Kokai) No. 302567/1999 (c), Japanese Unexamined Patent Publication (Kokai) No. 349859/1999 (d), Japanese Unexamined Patent Publication (Kokai) No. 034426/2000 (e) and Japanese Unexamined Patent Publication (Kokai) No. 103866/2000 (f)]. There have been disclosed that these methods make it possible to highly homogeneously disperse the curable resin and the curing agent.

However, the methods proposed by the above related arts (a), (d) and (e) are adapted to the acrylic powdery coating materials but cannot be adapted to the polyester powdery coating materials. That is, the polyester powdery coating materials use a resin and a curing agent different from those of the acrylic powdery coating materials and, hence, the solvents used by these related art cannot be readily used. Another reason is that the polyester powdery coating materials have properties that are basically different from the properties of the acrylic powdery coating materials in regard to weather resistance or chip resistance.

Further, though the prior arts (b) and (c) are not particularly specifying the kinds of the powdery coating materials, what are concretely disclosed therein are acrylic powdery coating materials, and there is no concrete disclosure concerning the polyester powdery coating materials. In particular, the related art (b) discloses the use of acrylic resin solutions and curing agent solutions. These solutions, however, use different solvents. When these solvents are mixed together, therefore, the curing agent is often precipitated. Besides, the solutions are very lowly soluble in one another leaving a problem concerning the homogeneous dispersion of the curing agent. The related art (c) discloses an example of using a solvent which does dissolve the curing agent at all. In this case, too, a problem remains concerning the homogeneous dispersion of the curing agent.

The related art (f) is concerned with a method of producing an acrylic powdery coating material and a polyester powdery coating material by spray-drying, using a solvent which dissolves both the curable resin and the curing agent. However, the curing agent or the pigment easily breeds out on the surface of the powdery coating material obtained by spray-drying, leaving a problem in regard to homogeneity in the crosslinked density and the additive, and a film having a high degree of finish, appearance and properties is not still obtained.

Besides, the methods disclosed in the above-mentioned related arts (a) to (f) still leave many problems such as the necessity of vessels for dissolving starting coating materials, mixing devices for mixing the solutions thereof, and a large vapor-removing/recovering apparatus for removing large amounts of the solvent.

SUMMARY OF THE INVENTION

It is an object of the present invention to provide a method of producing a polyester powdery coating material which exhibits excellent film appearance such as smoothness and gloss by solving the above-mentioned problems inherent in the related art.

The present inventors have conducted keen study concerning a method of producing polyester powdery coating materials, have discovered the fact that a powdery coating material that gives a film featuring excellent smoothness and homogeneous color tone can be produced by continuously kneading a solvent and a starting material of a powdery coating material containing at least a curable polyester resin and a curing agent in a manner that not less than 20% of the curing agent that is used dissolves therein and, then, removing the solvent in the form of a vapor under a reduced pressure without the need of using a large apparatus for production.

According to the present invention, there is provided a method of producing a powdery coating material by using:

a curable polyester resin (A) having a hydroxyl group and/or a carboxyl group at the terminals thereof, and further having a number average molecular weight of from 1,000 to 30,000, a glass transition temperature of from 30 to 100° C.;

a curing agent (B) which is solid at normal temperature and is capable of being reacted with the hydroxyl group or the carboxyl group of the curable polyester resin (A); and a solvent (C) having a boiling point under normal pressure of from 50 to 130° C.;

said method comprising a step of kneading the curable polyester resin (A), the curing agent (B) and the solvent (C) under a temperature condition of from 50 to 130° C. so that not less than 20% by weight of the curing agent (B) is dissolved in the solvent (C) wherein the concentration of the solvent (C) in the kneading step is in a range from about 1.5 to 20% by weight and, then, removing the vapor of the solvent (C) under a reduced pressure.

In the present invention, it is desired that the solvent (C) is used in an amount of from 10 to 1000 parts by weight per 100 parts by weight of the curing agent (B). One preferred range of the concentration of the solvent (C) in the kneading step is in a range from about 1.5 to 20% by weight.

According to the present invention, the step of kneading the curable polyester resin (A), the curing agent (B) and the solvent (C); and the step of removing the vapor of the solvent (C), can be continuously conducted by using a single kneading/vapor-removing apparatus.

In this case, the kneading/vapor-removing apparatus may be a single-screw or twin-screw extruder or kneader having at least one vapor-removing port (vent).

In the present invention, further, the apparatus used in the step of kneading the curable polyester resin (A), the curing agent (B) and the solvent (C); and the apparatus used in the step of removing the solvent (C), can be connected together in cascade to continuously execute the kneading and the removal of the vapor.

In this case, the apparatus used in the step of kneading may be a single-screw or twin-screw extruder, a single-screw or twin-screw kneader or an in-line mixer. Further, the apparatus used in the step of removing the vapor may be a single-screw or twin-screw extruder, or a single-screw or twin-screw kneader having at least one vapor-removing port (vent).

In the present invention, further the kneading can be effected by feeding an additive (D) for the coating material into the step of kneading the curable polyester resin (A), the curing agent (B) and the solvent (C). The additive (D) used for the coating material may be at least the one selected from a melt fluidity-adjusting agent, a degassing agent, a pinhole preventing agent, an ultraviolet absorber, an antioxidant, a curing catalyst, a plasticizer, a anti-blocking agent, a powder fluidity-imparting agent and a pigment.

According to the present invention, a desired powdery coating material is obtained by pulverizing a mixture of the curing agent (B) and the curable polyester resin (A) which is obtained by removing the vapor of the solvent (C) therefrom.

DETAILED DESCRIPTION OF THE INVENTION

Figure 1:
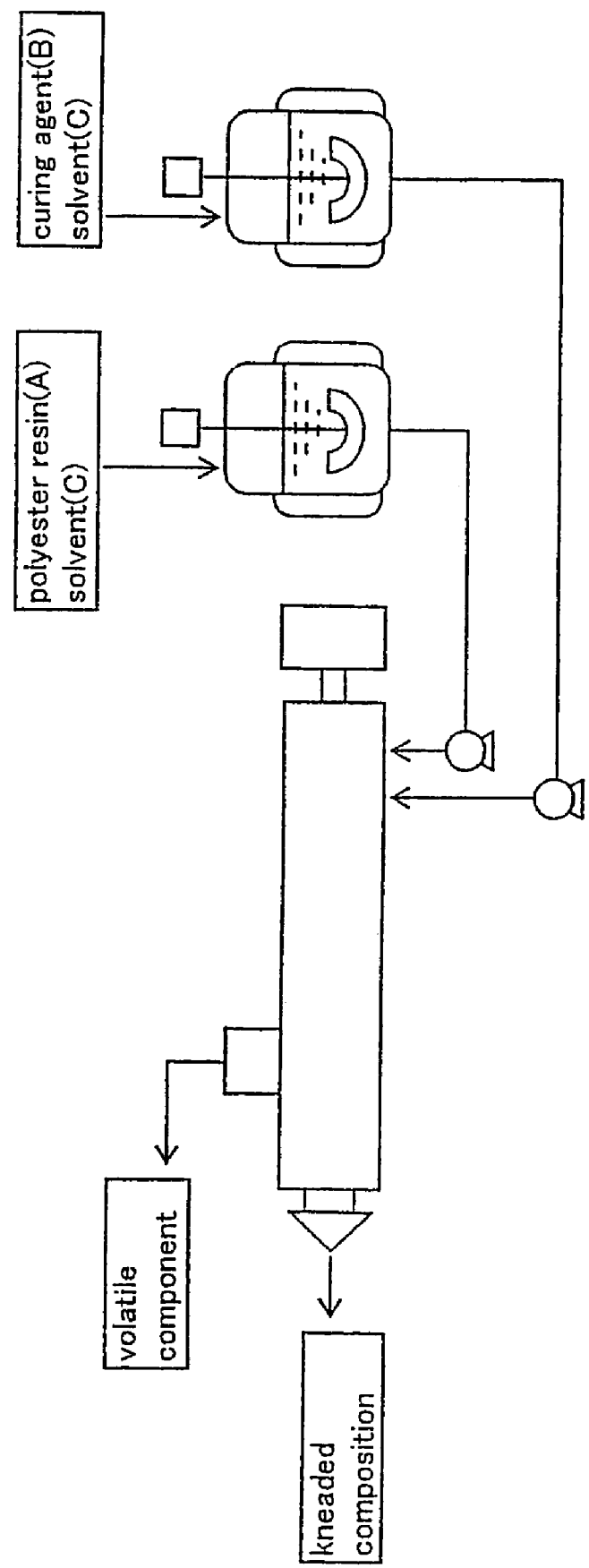
FIGS. 1 to 4 are diagrams illustrating preferred examples of the kneading/vapor-removing process employed by the production method of the present invention.

Curable Polyester Resin (A):

The curable polyester resin (A) that can be used in the present invention has a hydroxyl group and/or a carboxyl group at the terminals, and these terminal groups (hereinafter often called reactive groups) react with a curing agent (B) that will be described later to form a cured product.

The above curable polyester resin (A) can be produced according to a known method. That is, the method of production is conducted through two steps; i.e., a step of forming an oligomer for obtaining a low polymer by the esterification reaction or the ester-exchange reaction of a polybasic acid or an acid component of an ester-forming derivative thereof with an alcohol component of a polyhydric alcohol; and a step of forming a high-molecular material for obtaining a polyester resin of a desired molecular weight from the above low polymer.

Depending upon the cases, there can be employed a three-step method including a step of depolymerization for returning the molecular weight to a desired molecular weight after the step of forming a high-molecular material.

Though not limited thereto only, the acid component may include aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbomanedicarboxylic acid, tricyclodecanedicarboxylic acid and pentacyclododecanedicarboxylic acid; aromatic dicarboxylic acids such as terephthalic acid, isophthalic acid, phthalic acid, 2-methylterephthalic acid, naphthalenedicarboxylic acid, biphenyldicarboxylic acid and tetralindicarboxylic acid; ester-forming derivatives thereof (e.g., acid anhydride, acid chloride, ester); and oxycarboxylic acids such as paraoxybenzoic acid, which may be used in a single kind or in a combination of two or more kinds.

There is no particular limitation on the alcohol component, i.e., on the polyhydric alcohol, and its examples include aliphatic diols such as ethylene glycol, diethylene glycol, 1,2-propanediol, 1,3-propanediol, 2,2-dimethyl-1,3-propanediol, 1,2-butanediol, 1,3-butenediol, 1,4-butenediol, 2,3-butanediol, 2-methyl-1,3-butanediol, 2-methyl-1,4-butanediol, 2,3-dimethyl-1,4-butanediol, 1,5-pentanediol, 3-methyl-1,5-pentanediol, 2-methyl-1,3-pentanediol, 2-methyl-1,4-pentanediol, 2-methyl-1,5-pentanediol, 1,6-hexanediol, 2-ethyl-1,3-hexanediol, neopentyl glycol, 1,8-octanediol, 1,10-decanediol, 1,12-dodecanediol, 1,4-cyclohexanediol, and 2-butene-1,4-diol; and aromatic diols such as hydroquinone resorcin.

As the polyhydric alcohols exemplified above, there can be quoted glycerin, 2-methyl-1,2,3-propanetriol, 2-methyl-1,2,3-butanetriol, 2-methyl-1,2,4-butanetriol, 3-methyl-1,2,3-butanetriol, trimethylolpropane, trimethylolethane, 1,2,6-hexanetriol, penterythritol, polypropylene glycol, polytetramethylene ether glycol, polyoxyalkylene glycol, polymer polyol, polyester polyol, polycaprolactone polyol, polycarbonate polyol, polybutadiene polyol, acryl polyol, epoxy polyol and sucrose.

The above-mentioned various polyhydric alcohols can be used either in one kind or in a combination of two or more kinds.

The curable polyester resin (A) used in the present invention has a molecular chain terminal which chiefly comprises a carboxyl group or a hydroxyl group. In order to obtain a polyester resin having a molecular terminal chain chiefly comprising a carboxyl group (hereinafter simply referred to as a polyester resin having a carboxyl group at the terminal), the acid component is used in an excess amount relative to the alcohol component. In order to obtain a polyester resin having a molecular terminal chain chiefly comprising a hydroxyl group (hereinafter simply referred to as a polyester resin having a hydroxyl group at the terminal), the alcohol component is used in an excess amount relative to the acid component.

In the present invention, the curable polyester resin (A) has a glass transition temperature of from 30 to 100° C. and, preferably, from 40 to 80° C., and has a number average molecular weight of from 1,000 to 30,000 and, preferably, from 2,000 to 10,000. When the glass transition temperature is lower than the above range, the particles in the obtained powdery coating material melt-adhere together to deteriorate anti-blocking property. When the glass transition temperature is higher than the above-mentioned range, the melt viscosity increases at the time of printing causing a decrease not only in the finishing property but also in the blending of the rein, curing agent and solvent during the kneading, making it difficult to obtain a powdery coating material of a homogeneous composition. When the number average molecular weight is smaller than the above-mentioned range, the obtained powdery coating material exhibits poor anti-blocking property. When the number average molecular weight is larger than the above-mentioned range, on the other hand, it becomes difficult to obtain a film having smooth appearance.

In the present invention, the number average molecular weight is measured by the gel permeation chromatography (GPC). The sample is a tetrahydrofuran solution in which the resin is dissolved in an amount of 0.3 parts per 100 parts by weight of the tetrahydrofuran, and is measured by the GPC, e.g., by the GPC, Model 8020, manufactured by Toso Co., and the number average molecular weight is calculated as polystyrene.

Further, the glass transition temperature (° C.) is measured by the DSC method (differential scanning calorimetric method, raising the temperature at a rate of 10° C./min.), and a glass transition temperature (Tmg) at an intermediate point is regarded to be the glass transition temperature (Tg).

In the present invention, it is desired that the curable polyester resin (A) having a hydroxyl group at the terminal has a hydroxyl group value in a range of from 10 to 130 mg KOH/g and, particularly, from 20 to 120 mg KOH/g, and that the curable polyester resin (A) having a carboxyl group at the terminal has an acid value in a range of from 10 to 100 mn KOH/g and, particularly, from 20 to 80 mg KOH/g. When the hydroxyl group value and the acid value are smaller than the above-mentioned ranges, the film fails to exhibit anti-fouling property to a sufficient degree. When the hydroxyl group value and the acid value are larger than the above-mentioned ranges, on the other hand, the film fails to exhibit weather resistance to a sufficient degree.

Curing Agent (B)

The curing agent (B) used in the present invention reacts with the hydroxyl group or the carboxyl group at the terminal of the above-mentioned curable polyester resin (A). Therefore, a suitable curing agent (B) is used depending upon the kind of the terminal group of the polyester resin.

When, for example, the curable polyester resin (A) has a hydroxyl group at the terminal, though there is no particular limitation, the curing agent (B) is preferably an isocyanate compound such as aliphatic, alicyclic or aromatic polyisocyanate; a blocked isocyanate compound obtained by blocking the polyisocyanate with a blocking agent such as phenols, caprolactams or alcohols; an uretdione compound in which isocyanato groups are cyclized and blocked; an amino compound as represented by tetramethoxy glycolyl; or a cyanate compound as represented by 2,2-bis(4-cyanatephenyl)propane. These compounds can be used in one kind or in a combination of two or more kinds. Among them, preferred examples are the blocked isocyanate compound, the uretdione compound and amino compound.

When the curable polyester resin (A) has a carboxyl group at the terminal, though there is no particular limitation, the curing agent (B) is preferably an epoxy compound having an epoxy group of triglycidylisocyanurate or an epoxy resin, such as epichlorohydrin-bisphenol A, novolak or glycidyl ether; an acrylic resin containing a glycidyl group or a methylglycidyl group; or an amide compound as represented by beta-hydroxyalkylamide. These compounds can be used in one kind or in a combination of two or more kinds.

The curing agent (B) is usually used in an amount of from 0.7 to 1.3 equivalents per equivalent of the reactive groups (i.e., terminal hydroxyl groups or carboxyl groups) in the curable polyester resin.

Additives (D) for the Coating Material:

In the method of producing the powdery coating material of the present invention, there can be used, as required, known additives for the coating material, such as melt fluidity-adjusting agent, pinhole-preventing agent, ultraviolet ray absorber, antioxidant, curing catalyst, plasticizer, anti-blocking agent, powder fluidity-imparting agent, defoaming agent and pigment in addition to the above-mentioned curable polyester resin (A) and the curing agent (B). Though not limited thereto only, the pigment may be titanium oxide, phthalocyanine blue, phthalocyanine green, carbon black or iron oxide.

The additives (D) for the coating material are used in such amounts as to exhibit predetermined functions without spoiling properties such as film-forming property of the powdery coating material. For example, the pigment is used in an amount of usually not larger than 200 parts by weight par 100 parts by weight of the curable polyester resin (A).

Solvents (C):

The solvent (C) used for the method of producing the powdery coating material of the present invention is capable of dissolving at least not less than 20% by weight, preferably, not less than 30% by weight more preferably, not less than 50% by weight, most preferably, not less than 70% by weight of the curing agent (B) that is used at the time of continuously kneading the mixture under a temperature condition of from 50 to 130° C. and can be removed as the vapor under a reduced pressure. In order to suppress the curing reaction between the curable polyester resin (A) and the curing agent (B) during the removal of the vapor after the kneading, the removal of the vapor is conducted under a temperature condition which is as low as possible. The solvent (C) used in the present invention has a boiling point under normal pressure of from 50 to 130° C.

As the solvent (C) used in the present invention, there can be exemplified aromatic hydrocarbons such as toluene and benzene; halogenated aliphatic hydrocarbons such as dichloromethane, chloroform, tetrachloromethane, 1,2-dichloroethane, 1,1,1-trichloroethane, 1,1,2-trichloroethane, trichloroethylene, tetrachloroethylene and 1,2-dichloropropane; aliphatic carboxylic acid esters such as methyl formate, ethyl formate, propyl formate, butyl formate, isobutyl formate, pentyl formate, methyl acetate, ethyl acetate, propyl acetate, isopropyl acetate, butyl acetate, isobutyl acetate, sec-butyl acetate, methyl propionate, ethyl propionate, methyl butyrate, and ethyl butyrate; carbonic acid esters such as dimethyl carbonate and diethyl carbonate; cyclic ethers such as dioxane, tetrahydrofuran and tetrahydropyran; ether alcohols such as 2-methoxyethanol, 2-ethoxyethanol and 1-methoxy-2-propanol; alcohols such as methanol, ethanol, 1-propanol, 2-propanol, 1-butanol, isobutanol, 2-butanol, tert-butanol, 2-pentanol and 3-pentanol; and aliphatic ketones such as acetone, methyl ethyl ketone, 2-pentanone, 3-pentanone and methylisobutyl ketone, which may be used in a single kind or being mixed together in two or more kinds.

The above-mentioned solvent (C) must dissolve at least not less than 20% by weight of the curing agent at the temperature of 50 to 130° C. Therefore, a suitable solvent (C) is selected depending upon the kind of the curing agent that is used.

When, for example, the curable polyester resin (A) having a hydroxyl group at the terminal is used, the curing agent (B) that is used is the isocyanate compound, blocked isocyanate compound, uretdione compound, amino compound or cyanate compound as described above already. Among those described above, suitable solvents that dissolve the above curing agent (B) are as described below.

For the blocked isocyanate compound, uretdione compound and amino compound, there can be preferably used aromatic hydrocarbon, halogenated aliphatic hydrocarbon, aliphatic carboxylic acid ester, carbonic acid ester, cyclic ether, ether alcohol, alcohol and aliphatic ketone.

For the isocyanate compound and cyanate compound, there can be used aromatic hydrocarbon, halogenated aliphatic hydrocarbon, aliphatic carboxylic acid ester, carbonic acid ester, cyclic ether and aliphatic ketone.

When the curable polyester resin (A) having a carboxyl group at the terminal is used, the curing agent (B) that is used is the epoxy compound, acrylic resin containing a glycidyl group or a methylglycidyl group or amide compound. Among those described above, suitable solvents that dissolve the above curing agent (B) are as described below.

For the epoxy compound and acrylic resin, there can be used aromatic hydrocarbon, halogenated aliphatic hydrocarbon, aliphatic carboxylic acid ester, carbonic acid ester, cyclic ether and aliphatic ketone.

For the amide compound, there can be used alcohol.

The curable polyester resin (A) needs not be completely dissolved in the above-mentioned solvent (C). In order to homogeneously disperse the curable polyester (A) and curing agent (B) or additive (D) for the coating material, it is most desired to use the solvent (C) which favorably dissolves the curable polyester resin (A). As the above solvent (C), there can be exemplified aromatic hydrocarbon, halogenated aliphatic hydrocarbon, aliphatic carboxylic acid ester, cyclic ether and aliphatic ketone.

Mixing/Kneading:

In the present invention, the above-mentioned curable acrylic resin (A), curing agent (B) and additive (D) which is, as required, used for the coating material, are continuously wet-mixed (kneaded) in the presence of the above-mentioned solvent (C) and, then, the solvent is continuously removed as the vapor under a reduced pressure. The continuous kneading and the removal of the vapor is conducted in a temperature range of from 50 to 130° C. to suppress the curing reaction between the resin (A) and the curing agent (B).

In the present invention, it is necessary that the above kneading is conducted in a state where at least not less than 20% by weight (preferably, not less than 30% by weight, more preferably, not less than 50% by weight, and most preferably, not less than 70% by weight) of the curing agent (B) that is used is dissolved. That is, upon conducting the kneading in a state where not less than a predetermined amount of the curing agent (B) is dissolved, the curing agent (B) is more dispersed in the resin (A). The thus obtained powdery coating material enables the curing reaction to proceed homogeneously, and there is obtained a film featuring excellent surface smoothness and mechanical properties. Further, the components such as pigment and the like that do not dissolve in the solvent, are favorably dispersed, and the film exhibits excellent sharpness and gloss.

In the present invention, therefore, the solvent (C) is used in an amount of from 10 to 1000 parts by weight, preferably, from 15 to 900 parts by weight and, more preferably, from 20 to 800 parts by weight per 100 parts by weight of the curing agent (B), so that not less than a predetermined amount of the curing agent (B) is dissolved. Expressed as the concentration of the solvent component during the kneading step, one preferred range of the concentration of the solvent (C) in the kneading step is from about 1.5 to 20% by weight. When the amount of use of the solvent (C) is smaller than the above-mentioned range, it becomes difficult to dissolve not less than a predetermined amount of the curing agent (B) that is used, and the resin (A) and other components (particularly, the curing agent (B)) cannot be blended together to a sufficient degree. When the solvent (C) is used in an amount larger than the above-mentioned range, the resin (A) and the other component can be blended together to an increased degree resulting, however, in an increase in the burden for removing the solvent, requiring a large vapor-removing apparatus and giving disadvantage in economy.

In the present invention, the above-mentioned kneading step and the vapor-removing step can be carried out in one stage by using a single continuously kneading/vapor-removing apparatus, or can be carried out in two stages by coupling together in cascade a continuous kneader that continuously conducts the kneading and the vapor-removing apparatus that removes the vapor of the solvent volatilized due to a reduction in the pressure.

The curable polyester resin (A), curing agent (B), and additive (D) used, as required, for the coating material can be separately thrown into the continuous kneading/vapor-removing apparatus or to the continuous kneading apparatus. They, however, may be mixed together in advance and may, then, be thrown. Before being thrown, though not being limited thereto, they can be mixed together by using the Henschel type mixer or the tumbler.

The solvent (C) can be directly side-fed to the continuous kneading/vapor-removing apparatus or to the continuous kneading apparatus instead of being mixed to other components. By using the solvent (C), further, there can be prepared a solution of the curable polyester resin (A) or of the curing agent (B), and can be side-fed (here, the side-feed stands for that some of the components to be kneaded are fed into the apparatus for kneading through a separate throw port located downstream of the throw port which is communicated with a main feed line).

When the kneading and the removal of the solvent are conducted in two stages as described above, the solvent (C) may be fed to the vapor-removing apparatus in the second stage so far as the solvent-removing apparatus has the kneading function.

Further, the additive (D) used, as required, for the coating material may be mixed into the curable polyester resin (A) or into the curing agent (B) so as to be continuously kneaded. Or, it may be continuously kneaded being dissolved or dispersed in the solution of the curable polyester resin (A) or in the solution of the curing agent (B).

In the present invention, the above-mentioned continuous kneading/vapor-removing apparatus that executes the kneading and the removal of the vapor in one stage, is an apparatus such as a single-screw or twin-screw extruder or kneader which is equipped with hoppers for stably feeding the components into the apparatus, metering feeders and metering pumps for feeding the solvent and solution, and exhibits a kneading function and a vapor-removing function under a reduced pressure.

As the single-screw extruder, there is used the one having a rotary shaft of the shape of a screw, or of the Torester type adapted to the kneading, of the Maddock type or of the torpedo type of a high shearing shape, and equipped with a known kneading portion of the notch type or the Dulmage type.

As the twin-screw extruder, there is preferably used the one equipped with a pair of screw shafts which rotate in the different directions or in the same direction and possess the kneading function.

It is necessary that either extruder has at least one vapor-removing port for removing the volatile components and is capable of removing the vapor of the solvent (C) through the vapor-removing port under a reduced pressure. When the extruder has a plurality of vapor-removing ports (vent), in particular, the degrees of reduction in the pressure can be separately set in the respective devolatilizing zones (portions where the vapor-removing ports are provided). In the extruder of this structure, the degree of reduction in the pressure can be increased toward the downstream side in the direction of extrusion to produce excellent vapor-removing (devolatilizing) performance, which is particularly desirable in the present invention. When there are provided a plurality of vapor-removing ports, the solvent or the solution can be fed into any kneading zone, and can be fed from one place or from two or more places being divided from each other.

The extruder which is particularly preferably used as the continuous kneading/vapor-removing apparatus in the present invention can be represented by, for example, TEM-37BS manufactured by Toshiba Kikai Co.

It is further desired that the kneader that can be used as the continuous kneading/vapor-removing apparatus is of a structure having at least one vapor-removing port, two stirrer shafts arranged in line in the transverse direction in the barrel, each shaft having a screw and a paddle. That is, the screw and the paddle are rotated in the same direction, so that the starting materials fed from an upper portion at one end of the barrel are fed into the kneading zone by the screws so as to be kneaded by the paddles in the kneading zone, and that the kneaded product is continuously discharged from the lower portion, from the side surface or from the front portion on the other side of the barrel. The kneader having the above structure can be represented by SC processor or KRC kneader manufactured by Kurimoto Tekkosho Co.

When used being coupled together in cascade, the continuous kneader and the vapor-removing apparatus are the above-mentioned single-screw or twin-screw extruders or kneaders. The in-line mixer can be used when the resin solution or dispersant and the curing agent solution or dispersant are to be mixed together. When the above-mentioned extruder, kneader or in-line mixer is used as a continuous kneader, no vapor-removing port is necessary. In this case, further, the vapor-removing apparatus has the kneading function, and at least some of the above-mentioned solvent (C) can be thrown into the vapor-removing apparatus.

Accordingly to the present invention, the solvent is vaporized and is removed as the vapor thereof being heated under a reduced pressure in the vapor-removing apparatus until the concentration of the nonvolatile components becomes not lower than 98.5% by weight and, preferably, not lower than 99.0% by weight. When the concentration of the nonvolatile components becomes lower than the above value, the antiblocking property may not be improved.

As will be understood from the foregoing description, the continuous kneading and the removal of the volatile compound can be conducted according to a variety of patterns depending upon the apparatus that is used. FIGS. 1 to 4 illustrate representative examples of the patterns.

FIGS. 1 to 4 illustrate examples of conducting the kneading and the removal of the vapor in one stage by using the continuous kneading/vapor-removing apparatus. For people skilled in the art, however, it will be very easy to replace the continuous kneading/vapor-removing apparatus by the above-mentioned continuous kneader and the vapor-removing apparatus which are coupled together in cascade.

In the pattern shown in FIG. 1, a resin solution is prepared by dissolving or dispersing the curable polyester resin (A) in the solvent (C) and, separately, a curing agent solution is prepared by dissolving or dispersing the curing agent (B) in the solvent (C). These solvents are fed to the continuous kneading/vapor-removing apparatus to continuously conduct the kneading and the removal of the vapor through the vapor-removing port. These solvents may be fed through separate feed ports. Or, these solvents may be mixed together in advance by using an in-line mixer such as static mixer, and may then be fed. It is further allowable to dissolve or disperse the curable polyester resin (A) and the curing agent (B) in the solvent (C) by using the same dissolving vessel, and supply them to the continuous kneading/vapor-removing apparatus. As described already, however, the kind and amount of the solvent (C) are so determined that at least 20% by weight of the curing agent (B) that is used is dissolved during the kneading. This quite holds true in the following patterns shown in FIGS. 2 to 4.

Figure 2:
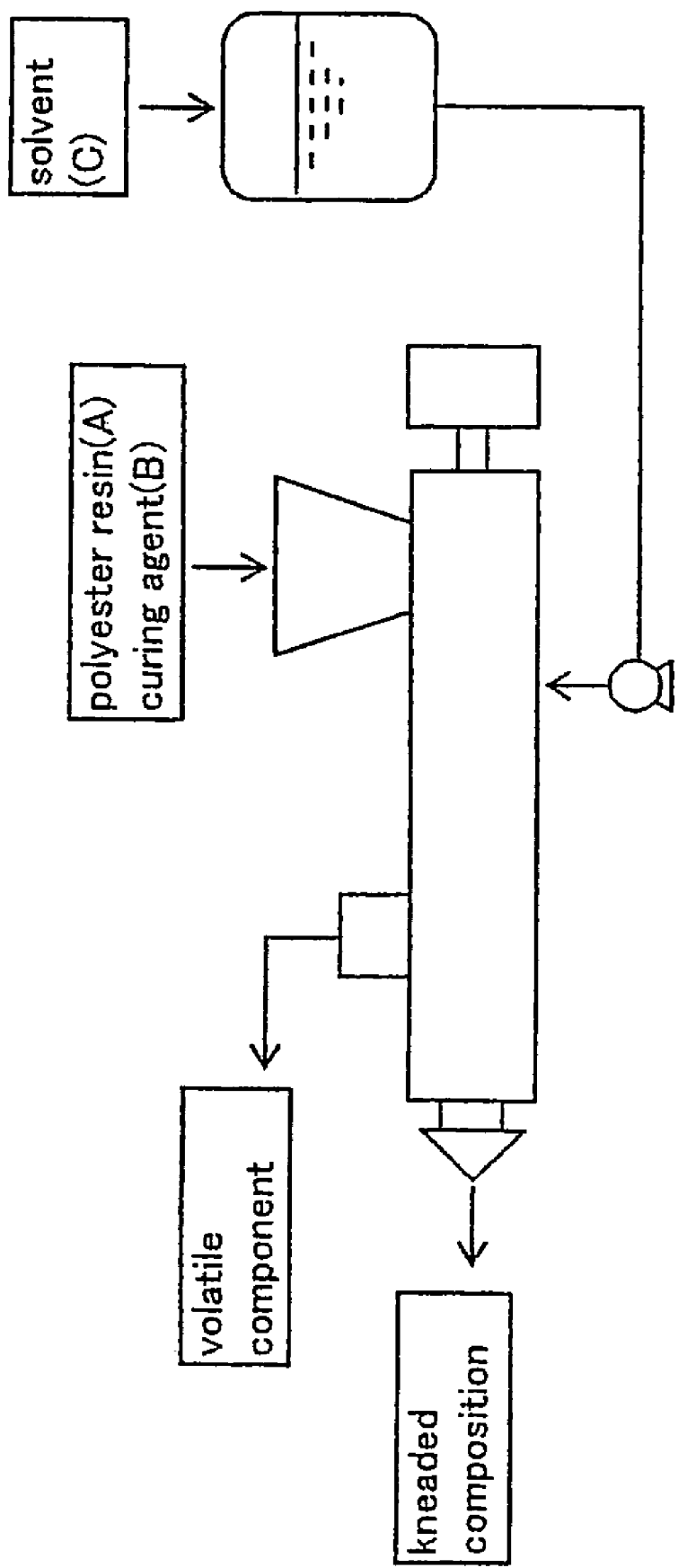

In the pattern shown in FIG. 2, the curable polyester resin (A) and the curing agent (B) are fed to the continuous kneading/vapor-removing apparatus through the same feed port, and the solvent (C) is side-fed to the continuous kneading/vapor-removing apparatus through another feed port, in order to continuously conduct the kneading in the presence of the solvent (C) and to remove the solvent through the vapor-removing port.

Figure 3:
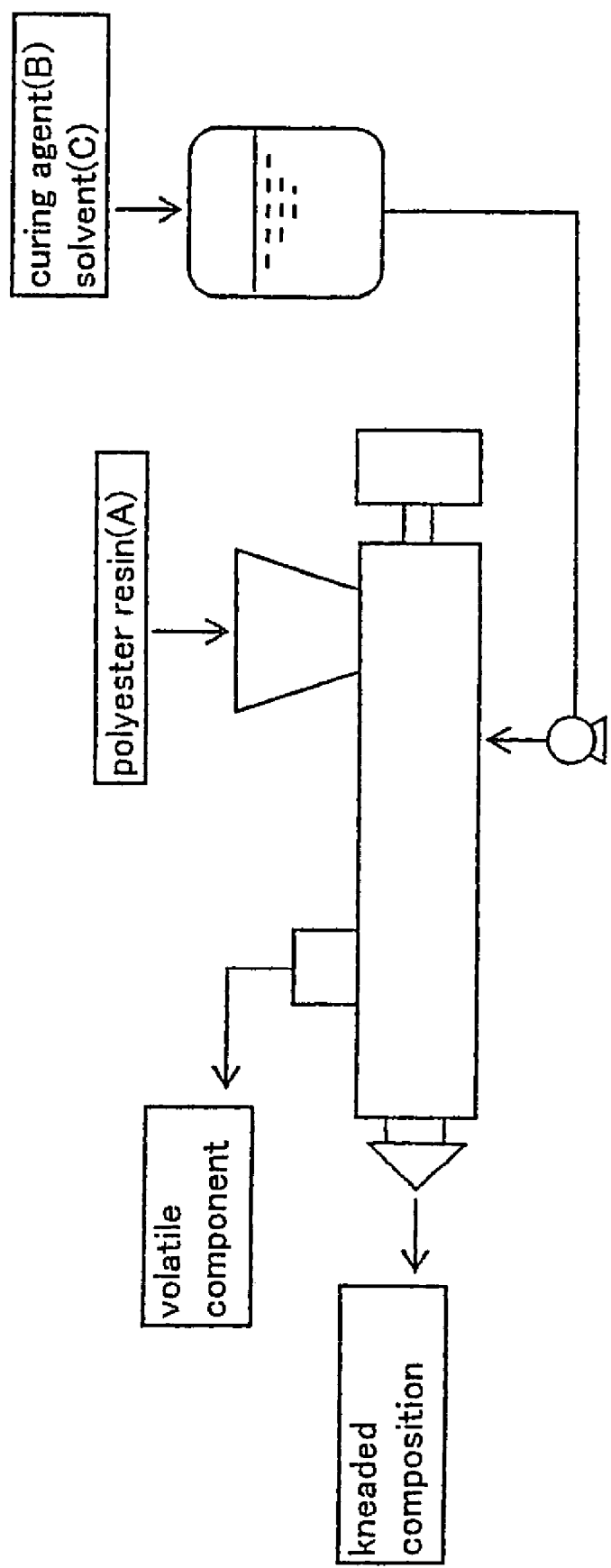

In the pattern shown in FIG. 3, the curable polyester resin (A) is fed to the continuous kneading/vapor-removing apparatus, a curing agent solution or dispersant comprising the curing agent (B) and the solvent (C) is side-fed to the continuous kneading/vapor-removing apparatus through a feed port different from the feed port of the curable polyester resin (A) to continuously conduct the kneading, and the solvent is removed through the vapor-removing port.

Figure 4:
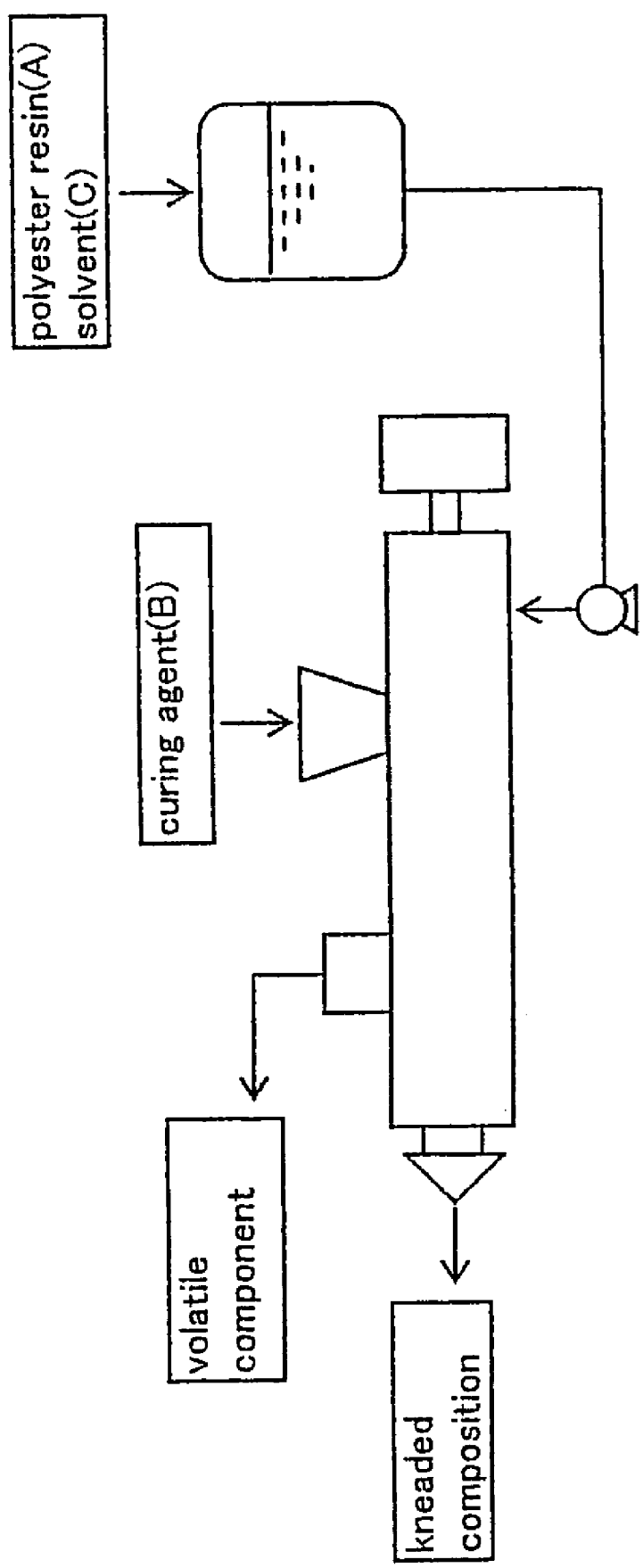

In the pattern shown in FIG. 4, the resin solution obtained by dissolving or dispersing the curable polyester resin (A) in the solvent (C) is fed to the continuous kneading/vapor-removing apparatus, and the curing agent (B) is fed through a separate feed port to continuously conduct the kneading and to remove the solvent through the vapor-removing port.

In any of the patterns shown in FIGS. 1 to 4, the additive such as pigment that is, as required, used for the coating material, is usually fed being mixed, in advance, into the curable polyester resin (A) or into the solution or dispersant of the curable polyester resin (A). The additive, however, may be fed being dissolved or dispersed in the curing agent (B) or in the solution of the curing agent (B).

The kneaded composition obtained by removing the solvent as described above is, as required, pulverized, and classified into a predetermined particle size and is used as a powdery coating material.

In the thus obtained polyester powdery coating material, the curing agent (B) and the additive such as pigment used, as required, for the coating material are homogeneously dispersed in the curable polyester resin (A). In particular, the curing agent is existing as fine particles. In the thus obtained powdery coating material, the curing reaction proceeds homogeneously making it possible to obtain a film that exhibits excellently smooth surface and mechanical properties. Due to the use of the solvent (C), further, the component such as pigment that does not dissolve in the solvent is favorably dispersed making it possible to obtain a film featuring excellent sharpness and gloss.

EXAMPLES

The invention will now be concretely described by way of Reference Examples, Examples and Comparative Examples to which only, however, the invention is in no way limited as a matter of course.

Properties of the powdery coating materials were evaluated in a manner as described below.

Concentration of Nonvolatile Components (% by Weight):

The powdery coating material in an amount of 2 g was dried at 140° C. for 30 minutes, and the weight-holding factors (% by weight) were calculated before and after the drying.

Particle Diameter (μm):

The volume average particle diameters of the powdery coating material are measured by using a laser diffraction scattering particle size distribution-measuring instrument, Model LA-910, manufactured by Horiba Seisakusho Co.

Anti-Blocking Property:

The powdery coating material in an amount of 30 g was introduced into a cylindrical container of a diameter of 2 cm, and a mass of the powdery coating material after preserved at 40° C. for 7 days was evaluated on the following basis.

○—No mass or no aggregation is recognized in the powdery coating material.

Δ—Mass is recognized to some extent in the powdery coating material, which, however, is so weakly aggregated that it cannot be nipped by figers.

x—Mass is recognized in the powdery coating material but can be nipped.

Film Appearance (Smoothness):

The powdery coating material was electrostatically applied onto a steel plate treated with zinc phosphate, cured in an oven heated at 160° C. for 20 minutes, and the formed film was evaluated for its smoothness by eyes.

○—Very smooth without dent or ruggedness.

Δ—Smoothness is slightly poor containing dents and ruggedness.

x—Smoothness is poor containing dents and ruggedness to a considerable degree.

Film Thickness:

The film thickness after being applied and cured, was measured by using LZ-300C manufactured by Kett Electric Laboratory Co.

Center Line Surface Roughness Ra (JIS B0601):

The surface of the film after being applied and cured was measured by using a probe-type surface roughness meter, SURFCOM, manufactured by Tokyo Seimitsu Co., and was expressed as an average value of ruggedness. Cut off was 0.8 mm. The smaller the value, the more smooth the film is.

Gloss (60°):

The surface of the film after being applied and cured was measured for its 60° mirror surface reflection factor (%) in compliance with JIS K5400, 7.6. Film sharpness: Appearance of the film was judged by eyes.

○: color tone is homogeneous, and image representation is excellent.

Δ: Color tone is slightly unhomogeneous, and image representation is slightly poor.

x: Image representation is poor.

Reference Example 1

Synthesis of a Hydroxyl Group-Terminated Curable Polyester Resin

38 Parts by weight of a neopentyl glycol and 1.5 parts by weight of a trimethylolpropane were fed into a reactor equipped with a thermometer, a stirrer, a reflux cooler, a nitrogen introduction port and a bottom drain pipe, and to which were further added 60.5 parts by weight of a terephthalic acid and 0.05 parts by weight of a dibutyltin oxide. The mixture was then stirred and heated up to 240° C. over a period of 6 hours while removing the water. The polycondensation reaction was further continued at this temperature to obtain a polyester resin having a hydroxyl group value of 34 mg KOH/g, a number average molecular weight of 3800 and a glass transition temperature Tg of 59° C.

The polyester resin was further coarsely pulverized by using a pulverizer and was used for Experiments appearing later.

Reference Example 2

Synthesis of a Carboxyl Group-Terminated Curable Polyester Resin 35.0 Parts by weight of a neopentyl glycol, 1.9 parts by weight of a trimethylolpropane and 63.1 parts by weight of a terephthalic acid were fed into the same reactor as that of Reference Example 1, and to which were further added 0.05 parts by weight of a dibutyltin oxide. The mixture was then stirred and heated up to 240° C. over a period of 6 hours while removing the water. The polycondensation reaction was further continued at this temperature to obtain a polyester resin having an acid value of 35 mg KOH/g, a number average molecular weight of 3700 and a glass transition temperature Tg of 57° C.

The polyester resin was further coarsely pulverized by using a pulverizer and was used for Experiments appearing later.

Reference Example 3

Preparation of a Sub-Starting Material 2.0 Parts by weight of a melt fluidity-adjusting agent (MODAFLOW POWDER 2000 manufactured by Monsanto Co.), 1.0 part by weight of a degassing agent (benzoin), and 97.0 parts by weight of a pigment (titanium oxide) were added and blended to obtain a sub-starting mixture for preparing a powdery polyester coating material.

Example 1

28.2 Parts by weight of the hydroxyl group-terminated polyester resin obtained in Reference Example 1, 4.65 parts by weight of a curing agent (VESTAGON B1530 manufactured by Hyulse Co., isophoronediisocyanate adduct epsilon-caprolactam block-isomer), 0.15 parts by weight of a curing catalyst (di-n-octyltin maleate) and 17.0 parts by weight of the sub-starting material of Reference Example 3, were dry-blended to obtain a starting mixture for preparing a powdery coating material.

The above starting mixture for preparing the powdery coating material was fed through a starting material hopper of a three-vent twin-screw vapor-removing extruder, TEM-37BS (manufactured by Toshiba Kikai Co.) of which the cylinder temperature was adjusted at 110° C. and the screw rotational speed was adjusted to 170 rpm, and was extruded at a rate of 50 kg/h.

At the same time, the starting material for preparing the powdery coating material was continuously kneaded while feeding ethyl acetate (solvent) into a first kneading zone downstream of the starting material hopper at a rate of 4 kg/h by using a metering pump, and the volatile components were partly removed through a first vent adjusted at 53 kPa on the downstream. The total non-volatile components of the kneading composition are 50 parts by weight and the solvent is 4.0 parts by weight as shown in Table 4. Table 5 shows that the concentration of the non-volatile component is 92.6% and that the concentration of the solvent component is 7.4%. Further, the kneading and the vapor-removing (the removal of the volatile components) were conducted through a second kneading zone, a second vent (6.7 kPa), a third kneading zone and a third bent (0.67 kPa) to obtain a kneaded composition.

The kneaded composition was pulverized by using a shock-type pulverizer and was further classified to obtain a powdery coating material having an average particle diameter of 25 μm. (In the above kneading composition, 100% by weight of curing agent was dissolved in the solvent.)

The thus obtained powdery coating material was electrostatically applied onto a steel plate treated with zinc phosphate and was cured in an oven heated at 180° C. for 20 minutes to form a film. The thus formed film was evaluated for its properties. Table 1 shows the results.

Example 2

15.0 Parts by weight of the sub-starting material of Reference Example 3 was added to 25.0 parts by weight of the hydroxyl group-terminated polyester resin obtained in Reference Example 1 and was dry-blended to obtain a starting resin material.

Further, 3.98 parts by weight of an isophoronediisocyanate adduct uretdione-coupled block-isomer (curing agent: VESTAGON BF1540) and 0.35 parts by weight of a curing catalyst (di-n-octyltin maleate) were added to 3.98 parts by weight of acetone (solvent) to prepare a curing agent solution heated at 56° C.

The above curing agent solution was side-fed to the extruder at a rate of 8.3 kg/h while continuously extruding the starting resin material prepared above under the same conditions as those of Example 1 at a rate of 40 kg/h, to continuously conduct the kneading and the vapor-removing thereby to obtain a kneaded composition. The kneaded composition was treated in the same manner as in Example 1 to obtain a powdery coating material. The total non-volatile components of the kneading composition are 44.3 parts by weight and the solvent is 3.98 parts by weight as shown in Table 4. Table 5 shows that the concentration of the non-volatile component is 91.4% and that the concentration of the solvent component is 8.6%. Table 1 shows the evaluated results of the properties of the powdery coating material and of the film. (In the above kneading composition, 100% by weight of curing agent was dissolved in the solvent.)

Example 3

25.2 Parts by weight of the hydroxyl group-terminated polyester resin obtained in Reference Example 1 and 10.8 parts by weight of methyl ethyl ketone as a solvent were mixed and heated to prepare a resin solution heated at 80° C.

Further, 4.18 parts by weight of a curing agent (VESTAGON B1530), 15.28 parts by weight of the sub-starting material of Reference Example 3, and 0.14 parts by weight of a curing catalyst (di-n-octyltin maleate) were dry-blended to prepare a starting material of the curing agent.

The resin solution was fed into the extruder at a rate of 36 kg/h by using a metering pump under the same conditions as in Example 1 but setting the temperature condition for the extruder to be 120° C. and, then, the starting material for the curing agent was fed to the extruder using a screw-type metering feeder at a rate of 19.6 kg/h to continue the kneading and the vapor-removing. (In the above kneading composition, 100% by weight of curing agent was dissolved in the solvent.) The total non-volatile components are 44.8 parts by weight and the solvent is 10.8 parts by weight as shown in Table 4. Table 5 shows that the concentration of the non-volatile component is 80.6% and that the concentration of the solvent component is 9.4%.

The obtained kneaded composition was treated in the same manner as in Example 1 to obtain a powdery coating material. Table 1 shows the evaluated results of the properties of the powdery coating material and of the film.

Example 4

25.4 Parts by weight of the hydroxyl group-terminated polyester resin obtained in Reference Example 1, 10.9 parts by weight of acetone (solvent) and 15.3 parts by weight of the sub-starting material of Reference Example 3 were mixed and heated to prepare a resin-pigment mixed solution heated at 56° C.

Further, 4.16 parts by weight of a curing agent (VESTAGON B1530), 0.14 parts by weight of a curing catalyst (di-n-octyltin maleate) and 4.36 parts by weight of acetone were mixed and heated to prepare a curing agent solution heated at 56° C.

The resin-pigment mixed solution was fed into the extruder at a rate of 52 kg/h and the curing agent solution was fed thereto at a rate of 8.6 kg/h under the same conditions as in Example 1 to continue the kneading and the vapor-removing thereby to obtain a kneaded composition. The kneaded composition was treated in the same manner as in Example 1 to obtain a powdery coating material. (In the above kneading composition, 100% by weight of curing agent was dissolved in the solvent.) The total non-volatile components are 45 parts by weight and the solvent is 15.26 parts by weight as shown in Table 4. Table 5 shows that the concentration of the non-volatile component is 74.6% and that the concentration of the solvent component is 15.4%.

Table 1 shows the evaluated results of the properties of the powdery coating material and of the film.

Example 5

A powdery coating material was prepared by conducting the kneading and the vapor-removing by the same method as that of Example 1 but using a tetrahydrofuran as the solvent.

Table 1 shows the evaluated results of the powdery coating material and of the film.

(In the above kneading composition, 100% by weight of curing agent was dissolved in the solvent.) The total non-volatile components are 50 parts by weight and the solvent is 4.0 parts by weight as shown in Table 4. Table 5 shows that the concentration of the non-volatile component is 92.6% and that the concentration of the solvent component is 7.4%.

Example 6

21.1 Parts by weight of the sub-starting material of Reference Example 3 were added to 38.9 parts by weight of the carboxyl group-terminated polyester resin obtained in Reference Example 2 and was dry-blended to prepare a starting resin.

Further, 2.01 parts by weight of a beta-hydroxyalkylamide (curing agent, Primid XL-522, manufactured by EMS-Chemie Co.) were added to 6.03 parts by weight of methanol heated at 64° C. and were substantially dissolved therein to prepare a curing agent solution.

The above curing agent solution was side-fed to the extruder at a rate of 8.04 kg/h while continuously extruding the starting resin material prepared above under the same conditions as those of Example 2 at a rate of 60.0 kg/h, to continuously conduct the kneading and the vapor-removing thereby to obtain a powdery coating material. Table 1 shows the evaluated results of the powdery coating material and of the film.

(In the above kneading composition, 100% by weight of curing agent was dissolved in the solvent.) The total non-volatile components are 62.01 parts by weight and the solvent is 6.03 parts by weight as shown in Table 4. Table 5 shows that the concentration of the non-volatile component is 91.1% and that the concentration of the solvent component is 8.9%.

Example 7

24.8 Parts by weight of the carboxyl group-terminated polyester resin obtained in Reference Example 2, 11.7 parts by weight of the epoxy resin (curing agent, Epikote #1003F, epoxy equivalent of 750 eq/g, manufactured by Japan Epoxy Resin Co.), 0.1 part by weight of a cuing catalyst (Curezol C11Z, manufactured by Shikoku Kasei Kogyo Co.) and 13.4 parts by weight of the sub-starting material of Reference Example 3, were dry-blended to prepare a starting mixture for producing a powdery coating material.

The starting mixture was fed to the extruder at a rate of 50 kg/h under the same conditions as those of Example 1 while side-feeding ethyl acetate (solvent) at a rate of 20 kg/h to continue the kneading and the vapor-removing, thereby to prepare a powdery coating material in the same manner as in Example 1.

(In the above kneading composition, 100% by weight of curing agent was dissolved in the solvent.) The total non-volatile components are 50 parts by weight and the solvent is 20.0 parts by weight as shown in Table 4. Table 5 shows that the concentration of the non-volatile components is 71.4% and that the concentration of the solvent components is 18.6%.

Table 1 shows the evaluated results of the powdery coating material and of the film.

(Side-feeding a small amount of methanol with the same starting composition as that of Example 6)

Example 8

38.9 Parts by weight of the carboxyl group-terminated polyester resin obtained in Reference Example 2, 2.01 parts by weight of a curing agent (Primid XL-522 manufactured by EMS-Chemie Co.), and 21.1 parts by weight of the sub-starting material of Reference Example 2 were dry-blended to obtain a starting mixture for the powdery coating material.

The starting mixture for the powdery coating material was fed into the starting material hopper of the three-vent twin-screw vapor-removing extruder TEM-37BS (manufactured by Toshiba Kikai Co.) adjusted at a cylinder temperature of 110° C. and a screw rotational speed of 170 rpm, and was extruder at a rate of 62 kg/h.

At the same time, the starting material for the powdery coating material was continuously kneaded while feeding methanol at a rate of 1 kg/h by using a metering pump into the first kneading zone downstream of the starting material hopper, and the volatile components were partly removed through the first vent adjusted at 53 kPa on the downstream side. The total non-volatile component is 62.01 parts by weight and the solvent is 1.0 parts by weight shown in Table 4. Table 5 shows that the concentration of the non-volatile components are 98.4% and that the concentration of the solvent component is 1.6%. The kneading and the vapor-removing were further continued through the second kneading zone, second vent (6.7 kPa) and the third kneading zone, third vent (0.67 kPa) to obtain a kneaded composition. The kneaded composition was treated in the same manner as in Example 1 to obtain a powdery coating material. Table 1 shows the evaluated results of properties of the powdery coating material and of a film thereof.

It was confirmed that 33% by weight of the curing agent had been dissolved under the above composition.

Comparative Example 1

A powdery coating material was prepared in the same manner as in Example 1 but without using ethyl acetate, and was evaluated. Table 2 shows the results.

The film obtained from this powdery coating material exhibited poor smoothness and poor properties.

Comparative Example 2

A powdery coating material was prepared in the same manner as in Example 1 but side-feeding ethyl acetate at a rate of 60 kg/h. The powdery coating material and a film thereof were evaluated for their properties. Table 2 shows the results.

The solvent was not completely removed from the extruder, and the blocking properties and the film properties were poor.

(In the above kneading composition, 100% by weight of curing agent was dissolved in the solvent.)

Comparative Example 3

A powdery coating material was prepared in the same manner as in Example 1 but using a hexane as the solvent that was side-fed. The powdery coating material and a film thereof were evaluated for their properties. Table 2 shows the results.

The film exhibited poor smoothness and poor properties.

(In the above kneading composition, smaller than 1% by weight of curing agent was dissolved in the solvent. Namely, no curing agent was dissolved.)

Comparative Example 4

A powdery coating material was prepared in the same manner as in Example 4 but using a xylene as the solvent. The powdery coating material and a film thereof were evaluated for their properties. Table 2 shows the results.

Though 100% by weight of curing agent was dissolved in the solvent, the solvent was not completely removed from the extruder, and the blocking properties and the film properties were poor.

TABLE 1

|  | Example 1 | Example 2 | Example 3 | Example 4 | Example 5 | Example 6 | Example 7 | Example 8 |
|---|---|---|---|---|---|---|---|---|
| Nonvolatile concentration (wt %) | 99.9 | 99.9 | 99.8 | 99.8 | 99.9 | 99.9 | 99.8 | 99.9 |
| Average particle diameter (μm) | 25 | 28 | 24 | 28 | 27 | 27 | 28 |  |
| Anti-blocking property | ○ | ○ | ○ | ○ | ○ | ○ | ○ |  |
| Film thickness (μm) | 42 | 45 | 43 | 47 | 45 | 44 |  |  |
| Film sharpness | ○ | ○ | ○ | ○ | ○ | ○ |  | ○ |
| Gloss (60° C.) | 93 | 94 | 93 | 94 | 94 | 95 | 95 | 94 |
| Appearance (smoothness) | ○ | ○ | ○ | ○ | ○ | ○ | ○ | ○ |
| Surface roughness Ra (μm) | 0.06 | 0.07 | 0.07 | 0.06 | 0.06 | 0.06 | 0.07 | 0.07 |

TABLE 2

|  | Comparative Example 1 | Comparative Example 2 | Comparative Example 3 | Comparative Example 4 |
|---|---|---|---|---|
| Nonvolatile concentration (wt %) | 99.8 | 97.4 | 99.6 | 96.1 |
| Average particle diameter (μm) | 25 | 23 | 24 | 28 |
| Anti-blocking property | ○ | X | ○ | X |
| Film thickness (μm) | 50 | 47 | 46 | 48 |
| Film sharpness | X | Δ | Δ | Δ |
| Gloss (60° C.) | 89 | 88 | 90 | 89 |
| Appearance (smoothness) | Δ | X | X | X |
| Surface roughness Ra (μm) | 0.13 | 0.12 | 0.13 | 0.11 |

TABLE 3

| Example No. | Polyester resin* | Curing agent* | Sub-starting material* | Catalyst* |
|---|---|---|---|---|
| 1 | 28.2 | 4.65 | 17.0 | 0.15 |
| 2 | 25.0 | 4.15 | 15.0 | 0.35 |
| 3 | 25.2 | 4.18 | 15.3 | 0.14 |
| 4 | 25.4 | 4.16 | 15.3 | 0.14 |
| 5 | 28.2 | 4.65 | 17.0 | 0.15 |
| 6 | 38.9 | 2.0 | 21.1 | — |
| 7 | 24.8 | 11.7 | 13.4 | 0.1 |
| 8 | 38.9 | 2.01 | 21.1 | — |

*(parts by weight)

TABLE 4

| Example No. | Total non-volatile Components* | Solvent* |
|---|---|---|
| 1 | 50 | 4 |
| 2 | 44.3 | 3.98 |
| 3 | 44.8 | 10.8 |
| 4 | 45 | 15.26 |
| 5 | 50 | 4 |
| 6 | 62.01 | 6.03 |
| 7 | 50 | 20 |
| 8 | 62.01 | 1 |

*(polyester resin to solvent is parts by weight)

TABLE 5

| Example No. | Concentration of non-volatile Components* | Concentration of solvent components* |
| --- | --- | --- |
| 1 | 92.6 | 7.4 |
| 2 | 91.4 | 8.6 |
| 3 | 80.6 | 9.4 |
| 4 | 74.6 | 15.4 |
| 5 | 92.6 | 7.4 |
| 6 | 91.1 | 8.9 |
| 7 | 71.4 | 18.6 |
| 8 | 98.4 | 1.6 |

*(wt %)

We claim:

1. A method of producing a powdery coating material by using:

a curable polyester resin (A) having a hydroxyl group and/or a carboxyl group at the terminals thereof, and further having a number average molecular weight of from 1,000 to 30,000, a glass transition temperature of from 30 to 100° C.;

a curing agent (B) which is solid at normal temperature and is capable of being reacted with the hydroxyl group or the carboxyl group of the curable polyester resin (A); and a solvent (C) having a boiling point under normal pressure of from 50 to 130° C.;

said method comprising a step of kneading the curable polyester resin (A), the curing agent (B) and the solvent (C) under a temperature condition of from 50 to 130° C. so that not less than 33% by weight of the curing agent (B) is dissolved in the solvent (C) wherein the concentration of the solvent (C) in the kneading step is 1.5 to 20% by weight, then, vapor-removing the solvent (C) under a reduced pressure wherein the powdery coating material is obtained by pulverizing said mixture of the curing agent (B) and the curable polyester resin (A) which is obtained by removing the vapor of the solvent (C) therefrom.

2. A method of producing a powdery coating material according to claim 1, wherein the curable polyester resin (A) has a number average molecular weight of from 2,000 to 10,000 and a glass transition temperature of from 40 to 80° C.

3. A method of producing a powdery coating material according to claim 1, wherein the curable polyester resin (A) has a hydroxyl group value of from 10 to 130 mg KOH/g.

4. A method of producing a powdery coating material according to claim 1, wherein the curable polyester resin (A) has an acid value of from 10 to 100 mg KOH/g.

5. A method of producing a powdery coating material according to claim 3, wherein the curing agent (B) is at least one selected from the group consisting of an isocyanate compound, a blocked isocyanate compound, an uretdione compound, an amino compound and a cyanate compound, and reacts with the hydroxyl group of the curable polyester resin (A).

6. A method of producing a powdery coating material according to claim 4, wherein the curing agent (B) is at least one selected from the group consisting of an epoxy compound, an acrylic resin having a glycidyl group or a methylglycidyl group, and an amide compound.

7. A method of producing a powdery coating material according to claim 1, wherein the curing agent (B) is used in an amount of from 0.7 to 1.3 equivalents per equivalent of the hydroxyl groups and/or the carboxyl groups in the curable polyester resin (A).

8. A method of producing a powdery coating material according to claim 1, wherein the solvent (C) is used in an amount of from 50 to 1000 parts by weight per 100 parts by weight of the curing agent (B).

9. A method of producing a powdery coating material according to claim 5, wherein the curing agent (B) is at least one selected from the group consisting of a blocked isocyanate compound, an uretdione compound and an amino compound, and the solvent (C) is at least one selected from the group consisting of aromatic hydrocarbons, halogenated aliphatic hydrocarbons, aliphatic carboxylic acid ester, carbonic acid ester, cyclic ether, ether alcohol, alcohol and aliphatic ketone.

10. A method of producing a powdery coating material according to claim 5, wherein the curing agent (B) is a cyanate compound, and the solvent (C) is at least one selected from the group consisting of aromatic hydrocarbons, halogenated aliphatic hydrocarbons, aliphatic carboxylic acid ester, carbonic acid ester, cyclic ether and aliphatic ketone.

11. A method of producing a powdery coating material according to claim 6, wherein the curing agent (B) is at least one selected from the group consisting of an epoxy compound and an acrylic resin having a glycidyl group or a methylglycidyl group, and the solvent (C) is at least one selected from the group consisting of aromatic hydrocarbons, halogenated aliphatic hydrocarbons, aliphatic carboxylic acid ester, carbonic acid ester, cyclic ether and aliphatic ketone.

12. A method of producing a powdery coating material according to claim 6, wherein an amide compound is used as the curing agent (B) and an alcohol is used as the solvent (C).

13. A method of producing a powdery coating material according to claim 1, wherein the step of kneading the curable polyester resin (A), curing agent (B) and solvent (C) and the step of vapor-removing the solvent (C), are continuously executed by using a single kneading/vapor-removing apparatus.

14. A method of producing a powdery coating material according to claim 13, wherein the kneading/vapor-removing apparatus is a singlescrew or twinscrew extruder or kneader having at least one vapor-removing port.

15. A method of producing a powdery coating material according to claim 1, wherein a first apparatus used in the step of kneading the curable polyester resin (A), curing agent (B) and solvent (C) and a second apparatus used in the step of vapor-removing the solvent (C), are coupled together in cascade to continuously execute the kneading and the vapor-removal of the solvent.

16. A method of producing a powdery coating material according to claim 15, wherein the first apparatus used in the step of kneading is a singlescrew or twin-screw extruder, a singlescrew or twinscrew kneader, or an in-line mixer.

17. A method of producing a powdery coating material according to claim 15, wherein the second apparatus used in the step of removing the vapor is a single-screw or twin-screw extruder, or a single-screw or twin-screw kneader having at least one vapor-removing port.

18. A method of producing a powdery coating material according to claim 1, wherein the kneading is conducted by feeding an additive (D) for the coating material to the step of kneading the curable polyester resin (A), curing agent (B) and solvent (C).

19. A method of producing a powdery coating material according to claim 18, wherein the additive (D) for the coating material is selected from the group consisting of a melt fluidity-adjusting agent, a degassing agent, a pinhole-preventing agent, an ultraviolet ray absorber, an antioxidant, a curing catalyst, a plasticizer, an anti-blocking improver, a powder fluidity-imparting agent, a pigment and mixtures thereof.

* * * * *